July 13, 1965     A. G. BALLARD     3,194,107
INTERNALLY THREADED INSERT WITH ROTATION PREVENTING MEANS
Filed May 31, 1963     2 Sheets-Sheet 2

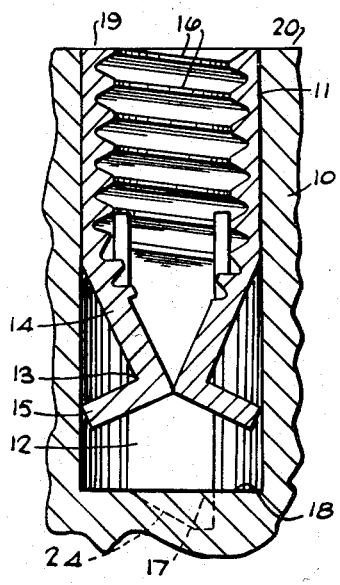
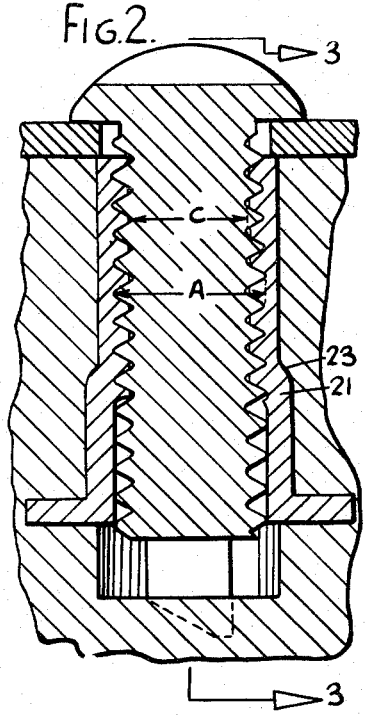
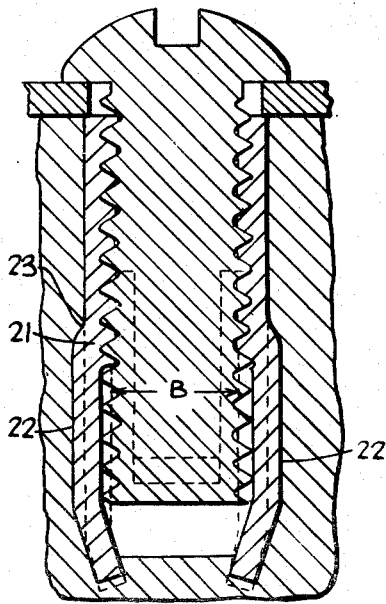
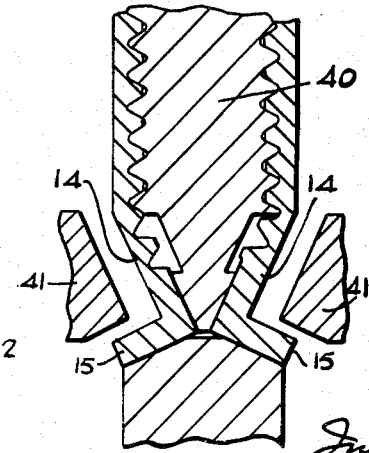

United States Patent Office 3,194,107
Patented July 13, 1965

3,194,107
INTERNALLY THREADED INSERT WITH ROTATION PREVENTING MEANS
Alfred George Ballard, Birmingham, England, assignor to G.K.N. Screws & Fasteners Limited, Birmingham, England, a British company
Filed May 31, 1963, Ser. No. 284,564
Claims priority, application Great Britain, June 5, 1962, 21,586/62
1 Claim. (Cl. 85—85)

This invention relates to an internally threaded sleeve of the type which is adapted to be fitted into a prepared hole in relatively soft material to receive a screw or like member with an externally threaded shank which engages the internal thread of the sleeve for the purpose of securing some other member or part to the member of relatively soft material in which the internally threaded sleeve is fitted.

The sleeve of the present invention is primarily envisaged for use in wood where it is generally not considered satisfactory to put a metal thread screw directly into the wood and an internally threaded sleeve of the kind above mentioned is used to provide a firm anchorage in the wood for a screw.

Internally threaded sleeves according to the invention may be used with other relatively soft materials such as plastics materials and it is for the purpose of clarity only in the following description that reference is made to the particular case of the use of an internally threaded sleeve with wood.

There have been various prior proposals for such sleeves and in particular proposals for an internally threaded sleeve having portions which could be displaced outwardly to dig or bite into the material surrounding the prepared hole, such portions generally being in the form of teeth or other pointed formations. The disadvantage of such prior proposals is that they do not provide any means for preventing a rotation of the sleeve itself when a screw is being driven in or when a threaded tool is being inserted to initially fit the sleeve in position in the wood and also it has been found that the force required to displace the pointed portions or other formations outwardly and cause them to bite into the surrounding material is such as to require a high torque applied to the screw which is being inserted such torque then being sufficiently excessive as to cause the sleeve to rotate and the teeth or other pointed formations to cut an annular groove in the material. This results in the sleeve being then held in the material but loose in that it is capable of rotation and cannot be removed for re-application, because removal of the sleeve under these circumstances involves mutilation of the sleeve and also possible mutilation of the material surrounding the hole.

Further, with such prior proposals it has been found that the resistance to axial pull-out load provided by the teeth or other pointed formations alone engaging in the material is generally not sufficient to satisfy modern standards.

The object of the invention is to provide an improved form of such internally threaded sleeve which will not rotate when a screw or other externally threaded member is being driven into the sleeve and which will provide for greater resistance to pulling out of the sleeve when under axial load and in use.

According to the invention there is provided an internally threaded sleeve for forming an anchorage for a screw in relatively soft material, said sleeve having a plurality of slots extending longitudinally from one end thereof to provide a number of legs, some of said legs being deformed inwardly towards the axis of the sleeve and each of the deformed legs having its free extremity bent outwardly away from said axis, the remainder of the legs being straight and extending, in the axial direction of the sleeve, beyond the extremities of the deformed legs, and the internal thread of the sleeve being formed so that it extends from the end of the sleeve remote from the legs and terminates at a position spaced away from the extremities of the legs.

The sleeve as above defined, therefore has a number of legs being straight legs which extend in the axial direction beyond the extremities of the other legs which are the deformed legs, so that when such sleeve is pressed into a preformed hole in a piece of wood, the hole being of a depth somewhat less than the overall length of the sleeve, the extremities of the straight legs will bite into the material at the bottom of the hole and thus form an anchorage to prevent any rotation of the sleeve about its axis. When a screw or other externally threaded stem is driven into the sleeve its end, upon coming into engagement with the deformed legs, will deflect these legs outwardly, causing the bent extremities thereof to bite into the material surrounding the hole and such extremities are preferably sharpened or pointed or in the form of teeth, so as to increase the degree of penetration into the material surrounding the hole.

A sleeve in accordance with the invention is conveniently made from a flat blank which has rolled thereon a thread extending over a portion only of one face of the blank and then the legs may be provided by pressing or cutting out the material and the blank thus formed may then be rolled up on a suitable mandrel and the deformed legs provided by pressing in certain of the legs of the blank.

In the formation of the initial blank, the legs which are to be deformed are preferably made shorter than the remaining legs and also each of such remaining legs preferably has its extremity cut away at an angle to provide an inclined edge which is inclined in the same general direction of inclination as the thread and as explained hereinafter this provides an anchorage wherein any tendency for rotation of the sleeve causes such legs to bite still deeper into the material at the bottom of the hole.

To illustrate the features of the present invention, there is hereinafter described, by way of example, one embodiment of an internally threaded sleeve made in accordance with the invention and in the following description of this embodiment reference is made to the accompanying drawings wherein:

FIGURE 1 is a section through a sleeve fitted into a pre-drilled hole in a piece of wood and prior to the insertion of the screw.

FIGURE 2 is a section through the sleeve after the screw has been driven in.

FIGURE 3 is a section on the line 3—3 of FIGURE 2.

Figure 4:
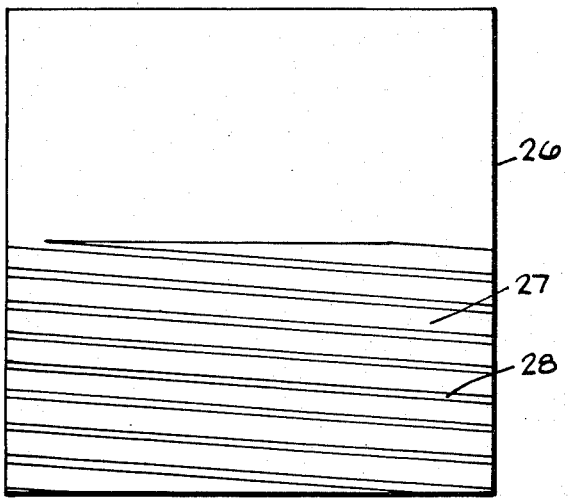
Figure 5:
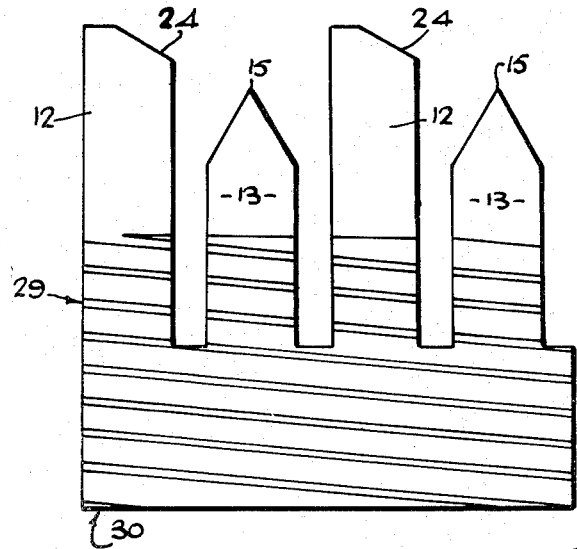

FIGURES 4, 5, and 6 are diagrammatic views illustrating a preferred method of manufacture of the sleeve.

Referring to FIGURE 1 the sleeve there shown is fitted in block 10 of wood and generally the sleeve comprises a portion 11 of cylindrical form provided with an internal screw thread and a remaining portion which is slotted as hereinafter described and formed so as to have a number of straight legs 12 alternating with deformed legs 13, each deformed leg having a part 14 which extends inwardly from the part 11 of the sleeve and has its extremity 15 bent outwardly away from the axis of the sleeve and preferably provided with a point (as can be seen from FIGURE 5), so that this part 15 forms a tooth projecting outwardly from the axis of the internally threaded sleeve.

As hereinafter described, the internal thread is provided by a rolling operation and is also of truncated form so that the crests 16 of the thread are somewhat flattened and are not of full thread height. Also, the thread extends over the whole of the cylindrical portion of the sleeve and also over parts of the legs 12 and 13 as can be seen already from FIGURE 5.

The major diameter of the thread is indicated at "A" in FIGURE 2, and it will be observed that this is greater than the internal diameter "B" (FIGURE 3) of the unthreaded portion of the sleeve defined by the legs 12, because during the thread rolling operation material has been displaced in the formation of the thread to form the troughs of the thread having the major diameter "A" and to form the crests 16 of the thread having the minor diameter "C" which is less than the diameter "B." The dotted lines in FIGURE 3 show the position of the straight legs 12 before the screw is driven in.

When such sleeve is inserted into the prepared hole in the block 10 the extremities 17 of the legs 12 bite into the material at the bottom 18 of the hole, the depth of such hole being pre-chosen so as to be somewhat less than the overall length of the sleeve measured from its outer end 19 to the extremities of the legs 12. Preferably the sleeve is pressed into the hole with the aid of a suitable tool so that it is correctly fitted and the outer end 19 is left flush or substantially flush with the outer surface 20 of the member 10.

A screw may then be applied directly to the sleeve, such screw being used to secure some other member or part to the member 10 or alternatively the sleeve may be anchored in the member 10 by driving an externally threaded stem of a suitable tool into the sleeve.

Whichever method is used the external thread of the screw or tool will have a major diameter corresponding to the diameter "A" of the internal thread of the sleeve and as this is greater than the internal diameter "B" between the unthreaded portions of the straight legs 12, the screw or tool, when its leading end reaches the position indicated by the reference numeral 21, will engage the unthreaded portion of the legs 12 with considerable interference and as the screw or tool is driven further in, it will cause the legs 12 to be displaced outwardly in a radial direction and to be pressed bodily into the material surrounding the hole, so that when the tool or screw has been completely driven in, the legs 12 will have been displaced to the positions shown in full lines 22, from those shown in dotted lines in FIGURE 3, and each leg 12 will be embedded in the material surrounding the hole.

Simultaneously, the screw or tool which is being driven into the sleeve will engage the deformed legs 13 and will deflect these outwardly (see FIGURE 2) to cause their pointed ends 15 to bite into the material surrounding the hole and also will cause the portion 14 of each such leg to be displaced outwardly and embedded in the material surrounding the hole in exactly the same fashion as is described above in respect of the legs 12.

Thus, after the driving in of the screw or tool the pointed ends 15 of the legs 13 have been driven into the material surrounding the hole and also the parts 14 of these legs together with the other legs 12 have been displaced bodily in the radially outwards direction and embedded in the material surrounding the hole.

Thus, in addition to the anchorage provided by the points 15 there is further anchorage provided by the parts 14 of the legs 13 and the legs 12 themselves bedding in the material which surrounds the hole and there is provided in effect a shoulder 23 extending around the exterior of the sleeve and providing a substantial resistance to pull-out of the sleeve when it is in use and has a screw engaged therein to which axial load is being applied tending to pull the screw and the sleeve out of the member 10. It will be understood that the reason for continuing the thread 16 from the cylindrical part 11 onto the legs 10 and 13 is to ensure that there will be provided some "lead" for the leading end of the screw when it reaches the beginning of the legs, so as to give the screw a "start" in the action of displacing the legs 12 and 13 outwardly.

It will thus be observed that the sleeve according to the invention provides considerably greater anchorage than internally threaded sleeves hitherto proposed.

It will further be appreciated that the legs 12 provide the initial anchorage against rotation of the sleeve when the screw or tool is being first driven in by virtue of their ends 17 biting into the material at the bottom of the hole and preferably each extremity 17 is cut away so as to provide an inclined edge 24 which is inclined in the same direction of inclination as the thread so that as the screw or tool is driven in, any tendency for rotation of the sleeve results in the pointed end 25 of each leg biting still further into the material at the bottom of the hole.

Referring now to FIGURES 4–6, there is shown a preferred method of manufacture of the sleeve above described commencing with a blank 26 which is provided over the portion 27 of its one face with a thread formation 28 and the thread 28 is formed by a rolling operation so as to provide the thread form as illustrated in FIGURE 1 having truncated crests 16.

This form of thread is preferred as in the subsequent operation of rolling up the blank into a sleeve, the truncated form of the thread eliminates any possibility of buckling of the thread due to the fact that when rolling the blank up the outer peripheral portions of the blank and thus the thread are being stretched whilst the inner peripheral portions are being compressed and if the thread were of full form with sharp crests there might be some tendency for buckling due to the compressive forces acting over the thinner section of the sharp crests, but such buckling is eliminated by the use of truncated threads not having crests of sharp form.

The blank depicted in FIGURE 4 may be cut off from a long strip of metal and the thread 28 may be rolled by a continuous rolling operation upon a long length of metal which is subsequently cut up into blanks of the appropriate size as indicated in FIGURE 4.

In the next step (FIGURE 5) the blank is passed to a suitable machine where it can be located by its edges 29 and 30 for the action of pressing or cutting tools to act upon the unthreaded portion and part of the threaded portion and form the legs 12 and 13 and as will be observed the legs 13 are made shorter in length than the legs 12 and are provided with pointed ends 15. Also, the legs 12 have their ends cut away to provide the inclined edges 24.

The slotted and pointed blank as formed is then rolled (see FIGURE 6) about a suitable mandrel as indicated at 40 and radially acting tools 41 are then advanced to engage the shorter legs 13 and deform these inwardly to provide the inwardly extending portion 14 and the outwardly bent extremity 15 as shown in FIGURE 1.

The formation of the legs 13 of shorter length than the legs 12 ensures in the form of sleeve shown, that the legs 13 when bent inwardly will be disposed a sufficient distance from the end of the hole 18 to guarantee such legs being completely deflected outwardly even if the screw which is used with such sleeve is short in length and does not extend completely to the bottom 18 of the hole. This, therefore, ensures the sleeve being properly used and takes into account the normal manufacturing tolerances on lengths of screws which may mean some screws of minimum length being used with these sleeves.

What I claim then is:

An anchorage sleeve device comprising, in combination, a substantially cylindrical sleeve having an internal thread and a screw adapted to have threaded engagement therewith, said sleeve having a plurality of circumferentially spaced slots extending longitudinally from one end of the sleeve to a position intermediate the ends thereof, such slots providing therebetween a number of separate legs having a uniform wall thickness, some of said legs being deformed inwardly towards the axis of the sleeve, each deformed leg having its free extremity bent outwardly away from said axis, and formed with a point, the remainder of said legs being straight, parallel to the axis of the sleeve, with their external surfaces defining a continuation of the external surface of the unslotted portion of the sleeve, and extending beyond the extremities of said deformed legs, the extremity of each straight leg being cut away to provide an inclined edge which is inclined in the same direction of inclination as the thread with respect to the axis of the sleeve, the opposite edge of each of said straight legs being straight throughout its length, said internal thread being formed so that it extends from the end of the sleeve remote from the legs and terminates at a position on said legs spaced away from the extremities thereof, the major diameter of said internal thread being greater than the internal diameter of the unthreaded portion of the sleeve defined by said straight legs and said screw having a threaded shank of axial length greater than the threaded length of the sleeve.

References Cited by the Examiner
UNITED STATES PATENTS

| | | | |
|---|---|---|---|
| 1,405,042 | 1/22 | Kraft | 29—533 |
| 1,470,858 | 10/23 | Maxwell | 70—370 |
| 1,664,796 | 4/28 | Spangle | 85—47 |
| 2,207,476 | 7/40 | Bernstein | 36—59 |
| 2,370,327 | 2/45 | Rosan. | |
| 2,561,433 | 7/51 | Uhle. | |
| 2,762,119 | 9/56 | Jackson | 29—533 |
| 2,982,989 | 5/61 | Heyer | 151—41.73 |
| 3,093,178 | 7/63 | Boyd | 151—41.73 |

EDWARD C. ALLEN, *Primary Examiner.*